United States Patent [19]
Drews

[11] 3,912,474
[45] Oct. 14, 1975

[54] DEPOSITING CHUTE FOR PNEUMATIC CONVEYANCE OF FLOCK

[75] Inventor: Werner Hermann Hans Drews, Rheydt, Germany

[73] Assignee: Trutzschler and Company, Rheydt-Odenkirchen, Germany

[22] Filed: Nov. 9, 1972

[21] Appl. No.: 305,210

Related U.S. Application Data

[63] Continuation of Ser. No. 84,293, Oct. 27, 1970, abandoned.

[30] Foreign Application Priority Data

Oct. 3, 1969 Germany............................ 1950022

[52] U.S. Cl. ..................... 55/524; 138/146; 302/64
[51] Int. Cl............................................. B01d 39/12
[58] Field of Search ............... 302/59, 64; 137/375; 138/145, DIG. 3; 19/105, 105 CF; 55/524

[56] References Cited
UNITED STATES PATENTS

| | | |
|---|---|---|
| 2,907,103 | 10/1959 | Lewis et al..................... 138/DIG. 3 |
| 3,050,786 | 8/1962 | St. John et al................. 138/DIG. 3 |
| 3,117,584 | 1/1964 | Elenbaas............................. 134/168 |
| 3,169,664 | 2/1965 | Meinicke ........................ 19/105 UX |
| 3,206,530 | 9/1965 | Boteler ............................ 137/375 X |
| 3,250,398 | 5/1966 | Adiletta ........................... 210/500 X |
| 3,265,192 | 8/1966 | Stadelman .......................... 198/204 |
| 3,280,848 | 10/1966 | Poettmann.......................... 138/145 |
| 3,310,349 | 3/1967 | Tilley et al............................ 302/59 |
| 3,334,650 | 8/1967 | Lowrey et al....................... 137/375 |
| 3,392,512 | 7/1968 | Ziolko et al. .......................... 55/400 |
| 3,402,731 | 9/1968 | Martin ................................. 137/375 |
| 3,414,330 | 12/1968 | Trutzschler................. 19/105 CF X |
| 3,449,891 | 6/1969 | Shohet et al...................... 55/348 X |
| 3,552,800 | 1/1971 | Trutzschter..................... 19/105 CF |

*Primary Examiner*—Bernard Nozick
*Attorney, Agent, or Firm*—Burgess, Dinklage & Sprung

[57] ABSTRACT

Improvements in depositing chutes for the pneumatic conveyance of flock by employing as the gas (air) outlet, conventional perforated sheet metal having a coating of low-stick or non-stick plastic, such as polytetrafluoro ethylene or polychlorotrifluoro ethylene, on the inside surface thereof.

4 Claims, 2 Drawing Figures

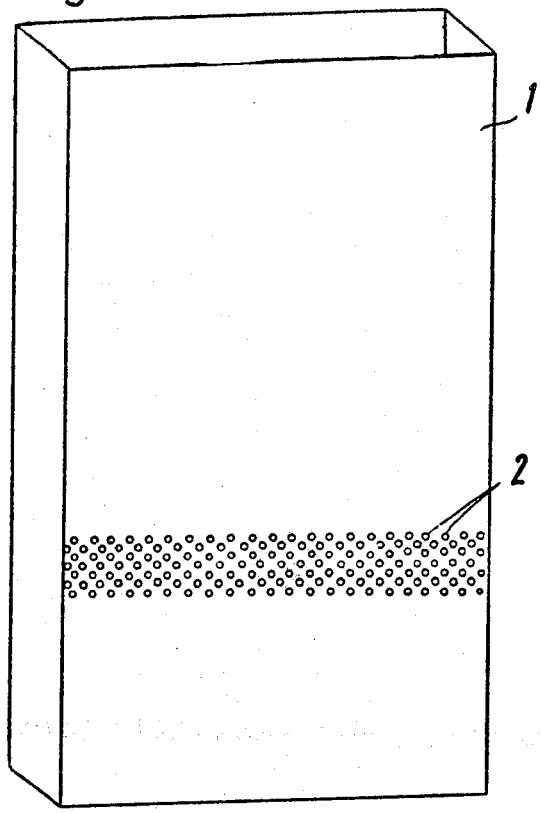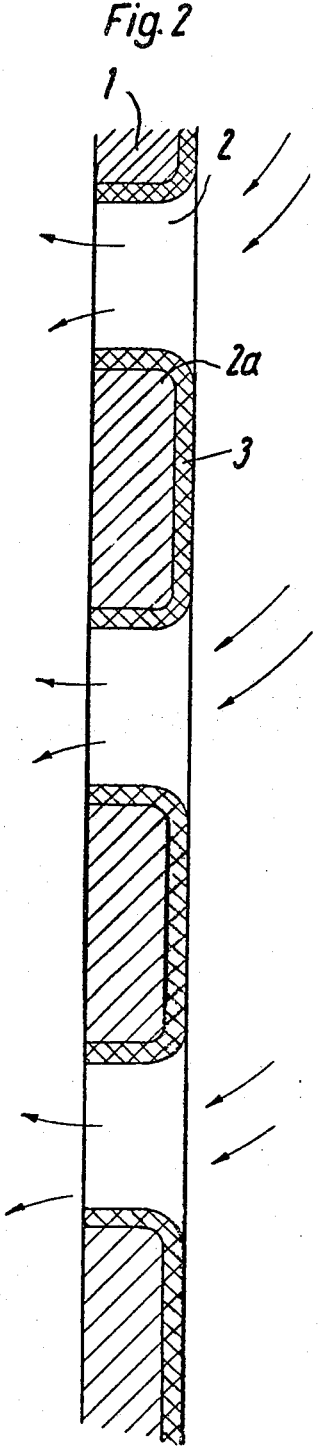

DEPOSITING CHUTE FOR PNEUMATIC CONVEYANCE OF FLOCK

This is a continuation of application Ser. No. 84,293 filed Oct. 27, 1970 now abandoned.

This invention relates to pneumatic conveyor chutes. It more particularly refers to depositing chutes connected to a flock transport pipe.

It is known in the art to provide one wall of the chute with a sheet metal cover having a large number of holes for the emergence of the air carrying the flock inside the chute. Such metal sheets have drawbacks in that the holes can become clogged with the flock. It has therefore previously been proposed to arrange in front of a large discharge point of the chute, a comb consisting of a plurality of rods parallel to and spaced apart from each other a distance which is sufficiently narrow that the passage of flock is substantially prevented (see U.S. Pat. No. 3,163,472). Flock flying against the rods then moves along these rods to their lower ends by pneumatic means, especially by a current of air which has one component in a substantially parallel direction to these rods. Combs of this type, provided with pointed teeth have been used commercially for a number of years. However, the use of such combs causes the chute to be more expensive.

It is an object of this invention to provide a novel chute gas (air) exit system for a pneumatic conveyor.

It is another object of this invention to provide an improved chute construction which is less expensive and more efficient.

Other additional objects of this invention will become apparent from a consideration of this entire specification, including the drawing and claims thereof.

In accord with and fulfilling these objects, one aspect of this invention resides in a modification of existing apparatus wherein perforated sheet metal is used along the inside of the chute instead of the above mentioned combs, however, in contrast to the prior art, such perforated sheet metal has coated on the inside surface thereof, at least in the vacinity of the perforations, a coating of a plastic material having a smooth surface and a coefficient of friction which is substantially smaller with respect to the fibrous flock than is the coefficient of friction of the conventional lacquered sheet metal surface employed in this use. It is particularly preferred to use as such a plastic material polytetrafluoro ethylene or other perhalogenated polyolefins such as polychlorotrifluoro ethylene. Surprisingly, such a coating reliably prevents the air holes from being clogged by flock.

Understanding of this invention will be facilitated by reference to the accompanying drawing in which:

FIG. 1 is a perspective view of a portion of a pneumatic chute showing the gas (air) exit apertures; and FIG. 2 is a section taken through that portion of the pneumatic chute containing the apertures.

It is known in the art to provide perforated sheet metal for use as sorting and grading screens for hard bulk material with an elastic coating in order to reduce the damage to the screen through the impingement of bulk material thereonto (see German published pat. no. 1,703,761). The elastic coating material of this reference is not selected for its coefficient of friction which property would have little or no bearing upon this known use.

In general, the holes in the pneumatic chute, according to this invention are conventional insofar as their shape and size are concerned. They may have any shape. Their maximum diameter should, depending on the type of flock being transported, not exceed about 2 to 5 mm. Care should be exercised to see that burrs at the edges of the apertures in the sheet metal are avoided; preferably, the edges of the holes in the sheet metal should be rounded off from the inside of the chute.

Referring now to the drawing and further particularizing this invention with respect thereto, the wall 1 of the pneumatic chute consisting of sheet metal and has provided a plurality of round holes 2 situated close to one another therein. The diameter of the holes, depending on the type of flock being transported in the chute, is about 2 – 5 mm. The holes are rounded off from the inside of the chute, i.e. their edges $2a$ are rounded off. The inside of the sheet metal 1 is coated with a layer 3 consisting of polytetrafluoro ethylene which covers also the inside wall of the holes 2 as illustrated in FIG. 2. The metal sheet may have, for instance a thickness of 1.5 mm and the polytetrafluoro ethylene layer 3 may have a thickness of 0.2 – 0.3 mm.

Prior to application of the polytetrafluoro ethylene layer 3 onto the sheet metal 1, the sheet metal is cleaned, preferably by sandblasting. The sandblasting achieves also the rounding off of the inside edges of the holes. Subsequently, the polytetrafluoro ethylene is applied as a powder and then baked on by conventional techniques.

The arrows in FIG. 2 illustrate the flow direction of the air.

The arrangement in accordance with the invention achieves a completely uniform depositing of flock in the depositing chute.

What is claimed is:

1. In a pneumatic conveyor a rectangular depositing chute having a rectangular cross section over its entire height characterized by metal walls which are parallel to one another which one of the walls contain apertures across said one wall in one area thereof adapted to permit the passage of pneumatic gas therethrough; the improvement which comprises a layer of plastic material on the inside of said metal walls and within the thickness thereof at said apertures, which plastic is a fluorinated polyolefin polymer which has a smooth surface and has a coefficient of friction which is lower than that of the metal walls preventing the apertures from being clogged.

2. The improved depositing chute claimed in claim 1 wherein the edges of said apertures are rounded from the inside of said chute toward the outside of said chute.

3. The improved depositing chute claimed in claim 1 wherein said plastic is polytetrafluoro ethylene.

4. A chute according to claim 1 wherein the apertures extend over the entire width of said one wall.

* * * * *